Figure 1:
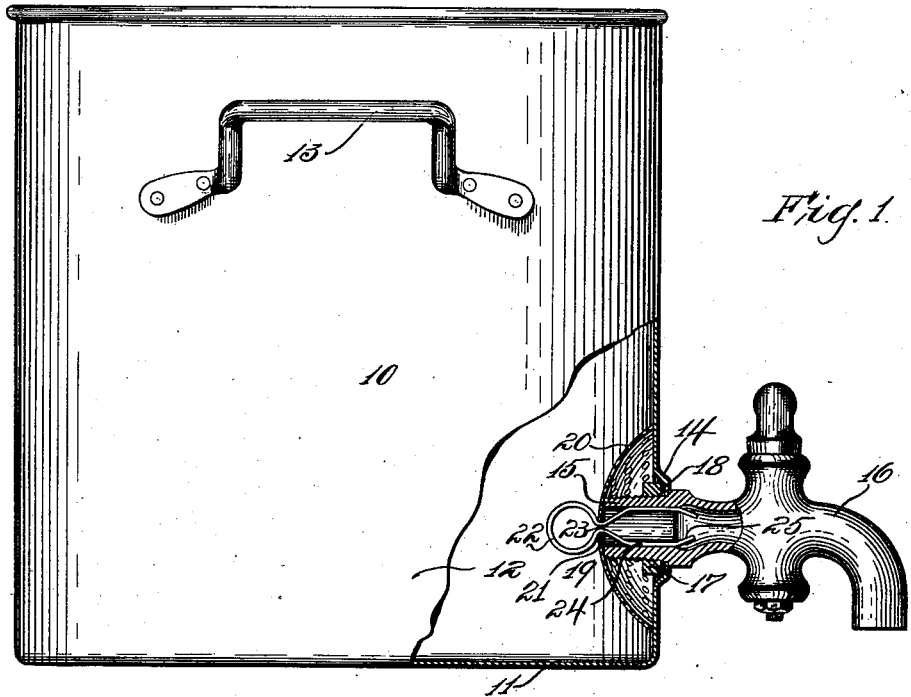

No. 755,967. PATENTED MAR. 29, 1904.
A. H. THIELE.
COOKING UTENSIL.
APPLICATION FILED SEPT. 21, 1903.
NO MODEL.

Witnesses:
G. F. Fuss.
C. A. Jarvis.

Inventor
A. H. Thiele.
By his Attorney,
F. H. Richards.

No. 755,967.

Patented March 29, 1904.

UNITED STATES PATENT OFFICE.

ALBERT H. THIELE, OF NEW YORK, N. Y., ASSIGNOR TO STRANSKY & CO., OF NEW YORK, N. Y., A FIRM.

COOKING UTENSIL.

SPECIFICATION forming part of Letters Patent No. 755,967, dated March 29, 1904.

Application filed September 21, 1903. Serial No. 173,921. (No model.)

*To all whom it may concern:*

Be it known that I, ALBERT H. THIELE, a citizen of the United States, residing in the borough of Brooklyn, in the county of Kings, city and State of New York, have invented certain new and useful Improvements in Cooking Utensils, of which the following is a specification.

This invention relates to and has for an object to provide an improved cooking utensil or culinary vessel.

In the cooking of many articles of food—for instance, certain classes of vegetables—it is desired to draw the water from the vessel without disturbing the contents, or rather the articles being cooked, and to let the same remain in the vessel either for the purpose of supplying fresh water and reboiling or to let the food steam off prior to its removal from the water. Many meats may be desired to be cooked in the same manner and also certain things from which the water or liquid part will be drawn off, leaving whatever solid matter there is remain in the vessel. A convenient means of removing the liquid from the vessel is by means of a cock located at the bottom of the vessel, whereby it may be emptied or partially emptied, as the case may demand, by merely manipulating the handle of the cock without moving the vessel or lifting the same, thus avoiding unnecessary work and the agitation of the liquid, which will stir up the sediment or break the articles of food which are being cooked. There will frequently run from the vessel through the cock certain more or less solid matter, as the case may be, which will clog up the cock owing to its form of interior construction and will at times get in such a position therein as to prevent the closing thereof, which will allow the discharge of fluid after it has been determined by the cook to cut off such flow, to obviate which it has been found desirable to employ a straining device. Such straining device, as is well known, must be removed from time to time for the purpose of cleansing the vessel and the strainer, and such strainers when they become coated with the finer particles—such as of coffee-grounds and other matter, as the case may be—are very undesirable things to handle, and also if it is desired to remove the same when they are hot from recent use it is difficult and dangerous to withdraw the same. Not only is there danger to the hand of the operator, but to the strainer itself. In the present improvement I have provided means whereby the strainer may be held to the cock securely and a handle provided for its removal which will act directly upon the fastening device and not upon the strainer, whereby it will be possible to remove the same without distortion of the strainer or to grasp the same with the hand.

Figures 2, 3:
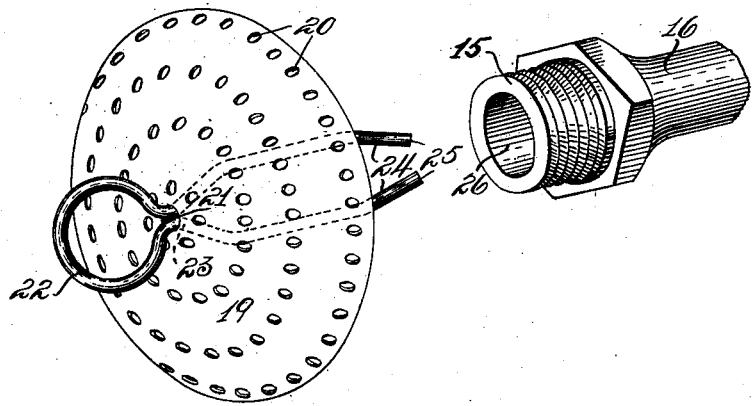

In the drawings accompanying and forming a part of this specification, Figure 1 is a side view of a vessel equipped with my present improvement, part of one corner being broken away to reveal the strainer and its fastening means. Fig. 2 is a perspective of the strainer and its fastening means, and Fig. 3 is a perspective of the end of a cock.

The vessel herein illustrated is designated in a general way by 10 and is a form of a culinary utensil which is provided with a plain bottom 11 and cylindrical side walls 12 and may have suitable handles 13 for moving the same. Near the bottom it is provided with an opening for a cock, which opening may have an outwardly-projecting flange or hub 14, through which the screw-threaded end 15 of a cock 16 may be received and be held by a suitable nut 17, a packing-ring 18 being shown as interposed between the hub 14 and the nut to make a tight joint. A strainer (designated in a general way by 19,) shown as arch-shaped and provided with a number of perforations 20, has a central opening 21, through which the handle and holding device projects, which in the present instance comprises a ring or handle proper, 22, bent down so that it has a neck portion 23, from which limbs 24 separate, so that such neck portion 23 is comparatively short and will engage either side of the strainer, permitting a certain degree of play. The limbs are also bent toward each other at 25 to permit ready entrance into the bore 26 of the cock. After the cock has been assembled with the utensil the limbs 24 may easily be inserted into such bore by holding the handle 22, whereby the strainer is placed in position without the operator having to grasp the strainer or to apply any force to it in placing the limbs in frictional engagement with the interior of the cock, and when it is desired to remove the strainer the handle 22 may be grasped by the finger or any convenient implement and the strainer removed by withdrawing the limbs 24 from their frictional contact with such cock and without distorting or otherwise marring or applying force to the strainer proper, the frictional holding device being rigid with the handle and in the present instance being integral therewith, it being shown as made from a piece of wire bent upon itself, although other forms may be resorted to as each particular employment of the invention may demand.

Having thus described my invention, I claim—

1. A cooking utensil comprising a vessel; a discharge-outlet therefor; an arch-shaped strainer to cover such opening; and a bent wire loosely carried by said strainer, and comprising a handle upon one side thereof and a pair of spring-legs upon the other side thereof organized to enter the discharge-outlet and frictionally hold the strainer in place.

2. A cooking utensil comprising a vessel, a cock carried thereby and adapted to draw the contents from the vessel, a strainer to cover the entrance of such cock, and means to fasten the same in place comprising a body loosely carried by the strainer and comprising a handle upon one side thereof and a pair of spring-legs upon the other side thereof organized to enter the inner end of the cock and hold the strainer against the side of the vessel by frictional contact with the interior of the cock.

3. As an article of manufacture the combination with a strainer; of a fastening-body carried thereby and supported intermediate of its ends by walls of an opening through the strainer and having a spring portion on one side of the strainer and a spring contact portion upon the other side thereof.

Signed at Nos. 9 to 15 Murray street, New York, N. Y., this 12th day of September, 1903.

ALBERT H. THIELE.

Witnesses:
JOHN O. SEIFERT,
CHAS. LYON RUSSELL.